No. 830,229. PATENTED SEPT. 4, 1906.
L. A. HERMANN.
DRIVING AND BRAKE MECHANISM IN BICYCLE HUBS.
APPLICATION FILED OCT. 18, 1904.

Witnesses:

Inventor:
Ludwig A. Hermann

UNITED STATES PATENT OFFICE.

LUDWIG ALBERT HERMANN, OF HAMBURG, GERMANY.

DRIVING AND BRAKE MECHANISM IN BICYCLE-HUBS.

No. 830,229.  Specification of Letters Patent.  Patented Sept. 4, 1906.

Application filed October 18, 1904. Serial No. 228,927.

*To all whom it may concern:*

Be it known that I, LUDWIG ALBERT HERMANN, a subject of the German Emperor, and a resident of Hamburg, Germany, have invented certain new and useful Improvements in a Driving and Braking Mechanism in Bicycle-Hubs, of which the following is a specification.

The object of the present invention is a free wheel or coaster hub with back-pedaling brake in which driving as well as braking is not effected as in one of the constructions most in use by two rigid cones being pressed into one another, but through expansible rings placed on conical pieces, said elastic rings having a conical inner surface and a cylindrical outer surface. These rings or mantles are being pressed tight between the conical pieces on which they repose and the inside of the hub-shell whereby they exercise a coupling or braking action both with their cylindrical and front surface. By this arrangement the pressure on the hub-shell is partially released, this pressure being more favorably distributed on the parts to be driven or braked. The life of the hub is materially increased thereby and a more powerful effect is obtained even with less exertion. Moreover, by means of a special device the lateral movement of the coupling part necessary to insure safe driving or braking is secured without the disagreeable friction caused by other similar devices, the present device being so arranged that there cannot be any friction between stationary and rotating parts either in driving or in coasting. A slipping of the crank is made quite impossible. The manufacturing of this coaster-brake is greatly simplified, as conical taperings in the hub-shell or special shaping of the hub or the extensively-used braking parts of soft metal riveted to the hub are entirely dispensed with. Such parts or conical surfaces being exposed to great tear and wear, they have often to be replaced, which is very difficult or impossible, whereas with the present construction the braking or coupling parts are easily detached and replaced without special tools.

An illustration of the present invention is shown in the accompanying drawings.

Figure 1:
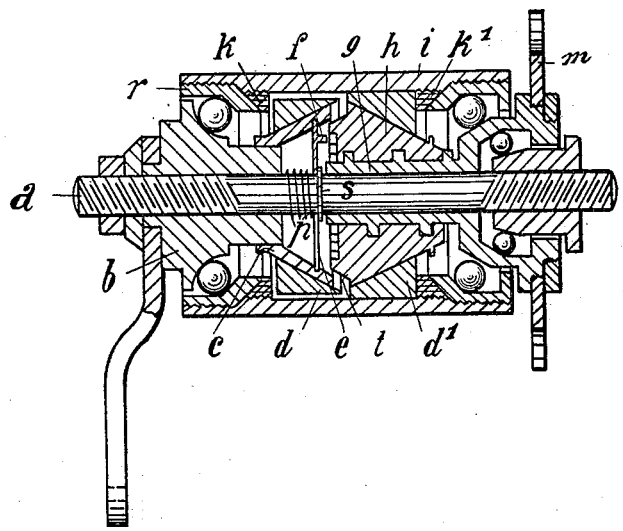
Figure 2:
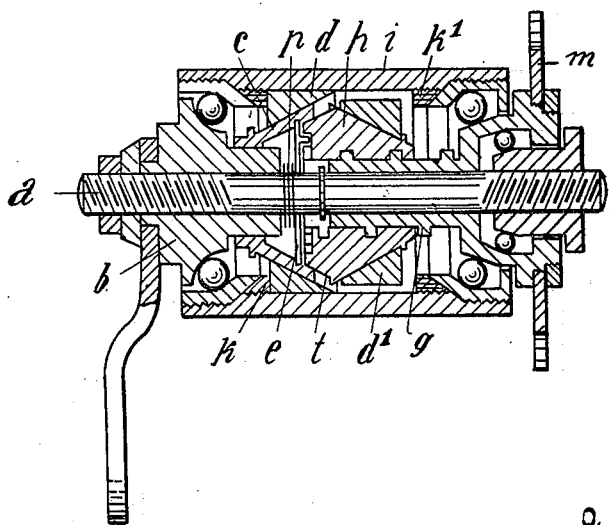

Figure 1 is a vertical section of the said free-wheel hub when in driving position, while in Fig. 2 a vertical section of said hub is shown during the operation of braking.

Similar letters refer to similar parts throughout both views.

In the said free-wheel hub and back-pedaling brake the brake-block cone $b$ is in rigid connection with the stationary axle $a$, a hollow conical piece $c$ being so arranged on said block-cone as to be laterally movable, but non-rotatable. On the outer conical surface of the conical piece $c$ an expansible ring $d$, having a conical inside and a cylindrical outside surface, is so placed as to be able to slide up and down on said conical piece $c$. A suitable edge on the left end of the said conical piece $c$ keeps said ring $d$ in position when resting and prevents any friction between this stationary ring $d$ and the rotating rings or shoulders $k$. In the interior of the conical piece $c$ a disk $e$, provided with a pin $f$, is so inserted that said disk may not be turned round unless some pressure is applied. The axle $a$ is provided with an abutment $s$, and the disk $e$ is pressed against said abutment $s$ by means of the spiral $p$, so as to give the said disk a fixed position. On the stationary axle $a$ a sleeve $g$, provided with a screw-thread, is arranged, on which sleeve the sprocket-wheel $m$ is secured. This sleeve $g$ carries a conical piece $h$, provided with female screw engaging the thread on the sleeve. The conical piece $h$ also carries an expansible ring $d'$ on its conical surface in the same manner as the conical piece $c$, the said expansible ring $d'$ having a cylindrical surface which when expanded is coupled with the cylindrical surface of the hub-shell $i$, while the front surface of said ring $d'$ is able to engage with the rings or shoulders $k'$. The parts $k$ and $k'$ are screwed into the hub-shell, or similar shoulders are arranged in any other convenient manner, said shoulders $k$ and $k'$ serving as abutment for the expansible rings $d$ and $d'$. These parts $k$ and $k'$ can also be beveled, so as to engage the front surface of rings $d$ and $d'$. The left end of the conical piece $h$ is provided with teeth adapted to engage the pin $f$. On each end of the axle $a$ a cup $r$ is also provided for the reception of the balls on which the hub-shell $i$ is supported.

The operation of the hub would be as follaws: When the wheel is resting, the pin $f$ on the disk $e$ is in one of the gaps on left side of conical piece $h$, and both expansible rings $d$ and $d'$ are not in touch with the interior surface of hub-shell $i$. If now the chain-wheel when driving power is applied is rotated in forward direction, the sleeve $g$, rigidly connected with sprocket-wheel $m$, also rotates, the male thread on said sleeve engaging the female thread in the conical piece $h$. As the pin $f$ prevents the conical piece $h$ from rotating together with sleeve $g$, the conical piece $h$ is moved to the right until the right-hand surface of ring $d'$ engages with the abutment $k'$, while at the same time the teeth on left side of conical piece $h$ are disengaged from pin $f$. By a further forward rotation of sleeve $g$ the expansible ring $d'$ is forced up on the conical surface of part $h$ and pressed both against cylindrical inner circle of hub-shell $i$ and against rings or shoulders $k'$, thereby establishing a coupling connection with rear-wheel hub, which will freely now rotate on its bearings without any friction against stationary parts. If now the forward driving is stopped, the dead motion of the wheel causes the hub-shell $i$ to further rotate, and with it the parts $d$ and $h$. This latter part is forced by the thread to move to the left, whereby the pressure of parts $k'$ against ring $d'$ is released. The latter slides down on the conical surface of part $h$ till the protruding edge is reached and contracts again. Thus the driving parts $h$ and $d'$ and hub-shell $i$ are disconnected, and the hub-shell $i$ can freely rotate on its balls. When the part $h$ is thrown to the left, the pin $f$ is again allowed to enter between the teeth on left side of said part $h$, remaining in this position during the operation of coasting. If now a backward pressure is applied on the pedals, the sleeve $g$, rigidly connected with sprocket-wheel $m$, is also moved backward and causes part $h$ to move to the left, the backward rotation of said part $h$ being prevented by pin $f$, fixed on disk $e$. An easy backward or forward movement of disk $e$ is also partly prevented by spiral spring $p$, which presses against the former; but this object can also be attained in any other convenient manner. The toothed end $t$ of the part $h$ being so shaped as to fit into conical inner surface of part $c$, the latter is forced to move also to the left simultaneously with part $h$. The part $d$, fixed on part $c$, follows this movement to the left until it comes against the abutment $k$, whereupon if the part $c$ is further moved to the left said ring $d$ is forced up on conical surface of part $c$ and expanded against interior wall of hub-shell $i$, being simultaneously in friction against abutment $k$. The motion of the hub-shell $i$ is thereby retarded or entirely stopped, as required.

The distance between the pin $f$ and the teeth on part $h$ can be exactly regulated by the setting of the axle $a$, the position of disk $e$ being determined by abutments. The hub should always be so mounted that when driven the teeth of part $h$ should pass close to pin $f$ without touching the same. The expanding rings $d$ and $d'$ may be provided with one or more cuts and correspondingly consist of one or more parts.

It is understood that the driving and braking mechanisms may be used separately and independently of each other, as well as combined.

What I claim as my invention, and desire to secure by Letters Patent, is—

1. In a coaster and brake mechanism, the combination of an axle, a hollow hub having bearings at its ends, a driver, an extension from said driver, threads thereon, a clutch-nut provided with corresponding threads mounted on said extension, an extension on said clutch-nut adapted to engage the brake-cone, a block within the hub secured against turning, a non-rotatable laterally-displaceable hollow conical piece mounted on said block, an expansible brake-ring $d$ mounted on said conical piece, and adapted to slide up and down on the latter, an abutment fixed to inner surface of hub-shell and adapted to serve as an abutment to the front surface of said brake-ring $d$, all so arranged that when the hollow conical piece is moved to the left, the expansible brake-ring $d$, mounted on said conical piece, is forced against said abutment and wedged between the hollow conical part and the hub-shell, substantially as and for the purpose described.

2. In a coaster and brake mechanism, the combination of an axle, a hollow hub having bearings at its ends, a driver, an extension from said driver, threads thereon, a clutch-nut provided with corresponding internal threads and with a toothed end mounted on said extension, a block within the hub secured against turning, a non-rotatable laterally-movable hollow conical brake-piece mounted on said block, tubular tapering surfaces within the hub-shell adapted to engage with said conical brake part, a disk $e$ in said conical brake part, a pin $f$ on said disk, adapted to engage the toothed end of the clutch-nut, substantially as and for the purpose described.

3. In a coaster and brake mechanism, the combination of an axle, a hollow hub having bearings at its ends, a driver, an extension from said driver, external threads thereon, a clutch-nut provided with corresponding internal threads and with a toothed end, mounted on said extension a block within the hub secured against turning, a non-rotatable laterally-movable hollow conical brake part mounted on said block, an expansible brake-ring $d$, mounted on said conical piece and adapted to slide up and down on the latter, an abutment fixed to the inner surface of the hub-shell and adapted to serve as an abutment to the front surface of said expansible brake-ring, a disk $e$ placed inside of conical part $c$ a pin $f$ on said disk adapted to engage the toothed end of the clutch-nut substantially as and for the purpose described.

4. In a driving and coaster mechanism, the combination of an axle, a hollow hub having bearings at its ends, a driver, an extension from said driver, external threads thereon, a clutch-nut provided with corresponding internal threads, mounted on said extension, an expansible clutch-ring having an inner conical and an outer cylindrical surface mounted on said clutch-nut, an abutment rigidly fixed to the hub-shell and adapted to serve as an abutment to the front surface of said clutch-ring, a block secured against turning a non-rotatable laterally-displaceable hollow conical piece mounted on said block, an expansible brake-ring mounted on said conical part, an abutment within the hub-shell adapted to serve as an abutment to the front surface of said expansible brake-ring, substantially as and for the purpose described.

5. In a hub of the character described, the combination of an axle, a hollow hub-barrel having bearings at its ends, a driver, an extension from said driver, external threads thereon, a clutch-nut provided with corresponding internal threads and with a toothed end, mounted on said extension, an expansible clutch-ring having an inner conical and an outer cylindrical surface, mounted on said clutch-nut, an abutment on the right-hand end of said clutch-nut, limiting the sliding motion of said expansible clutch-ring, an abutment rigidly fixed to hub-shell and adapted to serve as an abutment to the front surface of said clutch-ring, a block secured against turning, a non-rotatable laterally-displaceable hollow conical piece mounted on said block, an expansible brake-ring mounted on said conical part, an abutment within the hub-shell adapted to serve as an abutment to the front surface of said expansible ring, a disk $e$ in said hollow conical brake part, a pin $f$ on said disk $e$ adapted to engage the toothed end of the clutch-nut, substantially as and for the purpose described.

In testimony whereof I have signed my name to this specification in the presence of two subscribing witnesses.

LUDWIG ALBERT HERMANN.

Witnesses:
   WOLDEMAR HAUPT,
   HENRY HASPER.